United States Patent
Ebner et al.

(10) Patent No.: US 8,204,631 B2
(45) Date of Patent: Jun. 19, 2012

(54) METHOD AND DEVICE FOR INCREASING THE OPERATIONAL FLEXIBILITY OF A CURRENT-GENERATING SYSTEM, IN PARTICULAR A GAS TURBINE OR STEAM TURBINE

(75) Inventors: Günther Ebner, Gerhardshofen (DE); Tobias Herzog, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 743 days.

(21) Appl. No.: 11/991,215

(22) PCT Filed: Aug. 1, 2006

(86) PCT No.: PCT/EP2006/064918
§ 371 (c)(1),
(2), (4) Date: Apr. 7, 2009

(87) PCT Pub. No.: WO2007/025827
PCT Pub. Date: Mar. 8, 2007

(65) Prior Publication Data
US 2009/0216385 A1    Aug. 27, 2009

(30) Foreign Application Priority Data
Aug. 31, 2005   (EP) ..................................... 05018865

(51) Int. Cl.
G05D 3/12   (2006.01)
G05D 5/00   (2006.01)
G05D 9/00   (2006.01)
G05D 11/00  (2006.01)
G05D 17/00  (2006.01)
F02C 9/00   (2006.01)
F02C 7/00   (2006.01)

(52) U.S. Cl. ......... 700/287; 700/294; 700/291; 60/39.3; 60/39.53; 60/347; 376/218; 376/217; 376/241

(58) Field of Classification Search .................. 700/294, 700/287, 291; 60/39.3, 39.53, 347; 376/218, 376/217, 241
See application file for complete search history.

(56) References Cited

U.S. PATENT DOCUMENTS
4,283,634 A    8/1981   Yannone et al.
4,582,669 A *  4/1986   Watts et al. .................... 376/218
(Continued)

FOREIGN PATENT DOCUMENTS
EP      1920142 B1    4/2009
(Continued)

OTHER PUBLICATIONS

Sindelar, R: "Effektive Turbinenregelung" BWK Brennstoff Warme Kraft, Springer VDI Verlag Düsseldorf, vol. 51, No. 7/8, Jul. 1999, pp. 41-45, XP000847461; ISSN: 1618-193X, p. 1—p. 2.

Primary Examiner — Albert Decady
Assistant Examiner — Jason Lin

(57) ABSTRACT

Discussed is a method and device for increasing the operational flexibility of a current-generating system with a turboset, comprising a turbine coupled to an electrical generator, a power set point value being predefined, and a future target time at which the turboset is supposed to be at the power set point value, so that a power curve is determined via the power set point value and the target time, the turboset being operated starting from a actual power value at an actual time along the power curve such that the predefined power set point value is reached at the predefined target time. Also discussed is a gas turbine and to a steam turbine in accordance with the above description.

10 Claims, 1 Drawing Sheet

U.S. PATENT DOCUMENTS

| | | |
|---|---|---|
| 4,583,360 A | 4/1986 | Nick |
| 6,175,217 B1 * | 1/2001 | Da Ponte et al. ............... 322/19 |
| 2004/0021445 A1 * | 2/2004 | Harris .......................... 320/136 |
| 2004/0103068 A1 | 5/2004 | Bollapragada |
| 2004/0112037 A1 * | 6/2004 | Yagi et al. ...................... 60/39.3 |
| 2005/0257514 A1 * | 11/2005 | Morgan et al. ............. 60/39.281 |
| 2007/0217105 A1 * | 9/2007 | Christensen et al. ........... 361/89 |
| 2009/0216385 A1 | 8/2009 | Ebner et al. |

FOREIGN PATENT DOCUMENTS

| | | |
|---|---|---|
| JP | 60079106 A1 | 5/1985 |
| SU | 1040186 A1 | 9/1983 |
| SU | 1227823 A1 | 4/1986 |
| SU | 1295012 A1 | 3/1987 |

* cited by examiner

METHOD AND DEVICE FOR INCREASING THE OPERATIONAL FLEXIBILITY OF A CURRENT-GENERATING SYSTEM, IN PARTICULAR A GAS TURBINE OR STEAM TURBINE

CROSS REFERENCE TO RELATED APPLICATIONS

This application is the US National Stage of International Application No. PCT/EP2006/064918, filed Aug. 1, 2006 and claims the benefit thereof. The International Application claims the benefits of European application No. 05018865.5 filed Aug. 31, 2005, both of the applications are incorporated by reference herein in their entirety

FIELD OF INVENTION

The invention relates to a method for increasing the operational flexibility of a current-generating system with a turboset comprising a turbine and an electrical generator which is coupled to the turbine. The invention further relates to a device which in particular allows the execution of the method. The invention further relates to a gas turbine and a steam turbine.

BACKGROUND OF THE INVENTION

The power market is affected both by regular energy demands and by peak energy loads caused by consumers. In some cases the latter are often unpredictable. Seasonal predictable variations, such as specific public holidays and large users for example are frequently an exception here, since it is often known when current-consuming machines will be started up or shut down. In order to ensure that power consumption demands are always fully catered for, current-generating systems, such as gas turbine and steam turbine power stations are informed by the large users about the amount of power required at a particular target time. So that the gas turbine or steam turbine power stations produce the desired power at the contractually-agreed time, the turboset of the power stations must be started early by the operating personnel. The desired output is thus mostly reached far too early. This means that unnecessary costs arise for the power station operators as a result of the system being started up too early, with said costs having to be borne by the large users such as industry and small users such as domestic consumers. This is precisely the disadvantage of a liberalized power market.

SUMMARY OF INVENTION

The object of the invention is thus to specify a method for increasing the operational flexibility of a current-generating system with a turboset. A further object is to specify a device which in particular allows execution of the method. The method and also the device are to be able to be used in both steam and gas turbines.

This object related to the method is inventively achieved by specifying a method for increasing the operational flexibility of a current-generating system with a turboset comprising a turbine and an electrical generator coupled to the turbine, with a power setpoint value being predetermined and a future target time being predetermined at which the turboset is to have the power setpoint value, so that a power curve is determined by means of the power setpoint value and the target time, with the turboset, starting from an actual power at an actual time, being moved along a power curve such that the predetermined power setpoint value is reached at the predetermined target time.

The invention starts from the knowledge that the power setpoint value reached too early and the associated operating costs are the result of the manual handling of the system. The turboset will be started up too early as a result of this manual handling and also with the incorrect acceleration. The invention starts from the approach that both the power setpoint value and also the future target time will be predetermined at which the turboset is to exhibit the power setpoint value. This can be entered at any time via an operating console by the operating personnel for example. Furthermore both the actual power output and the actual time are known from the operating data. A power curve is now determined by means of these values. This power curve contains a start point at which the turboset begins to be started up, or for reduction of the power at a particular target time, also the time at which it begins to be powered down. Furthermore this power curve also includes the acceleration with which the turboset is powered up or down, starting from the actual time through to the target time. The turboset is thus moved, starting from the actual power at the actual time, along the power curve such that the predetermined power setpoint value is reached at the predetermined target time. The effect of this is a saving in useful energy since the power is essentially provided at precisely the right point. Reaching the power setpoint value too early by manually starting up and shutting down is avoided. This saves money. Furthermore a more accurate load profile can be created. A more accurate load profile allows power consumption to be better measured and to be calculated for large and small customers, which in turn relieves the load on the small customers. A further advantage is the user friendliness in that the load on the operating personnel is relieved.

In a preferred embodiment the power curve will be selected so that this curve acts on the generator and the turbines to extend their life. This also allows repair costs and maintenance costs to be reduced.

The power curve is preferably computed automatically. A fully-automatic system additionally reduces the load on the operating personnel. In addition operator errors are avoided.

In a further preferred embodiment the power curve will be computed taking into account the minimum and maximum power curve. This avoids damage to the turboset on power-up and power-down.

Preferably with a turboset which is provided in a gas turbine, the power curve is selected so that the NOx emissions are kept as low as possible. This depends on the efficiency of the of the turboset. Unnecessary emissions from incorrect powering up or powering down are avoided.

This object related to the device is inventively achieved by specifying a device for increasing the operational flexibility of a current-generating system with turboset comprising a turbine and an electrical generator coupled to the turbine, with an input unit for a power setpoint value, an input unit for a target time, as well as a readout unit for an actual power and a readout unit for an actual time, with the readout unit and the input units being connected to a computation unit for computing the power curve. The device is especially suitable for executing the method described above. The advantages of the method are thus also produced for the device.

Further features, characteristics and advantages of the invention emerge from the description of an exemplary embodiment and from the further dependent claims.

BRIEF DESCRIPTION OF THE DRAWINGS

The invention will be explained below in greater detail using examples which refer to a drawing.

This is a simplified representation and is not drawn to scale.

The same parts are shown by the same reference symbols in all the figures.

DETAILED DESCRIPTION OF INVENTION

Figure 1:
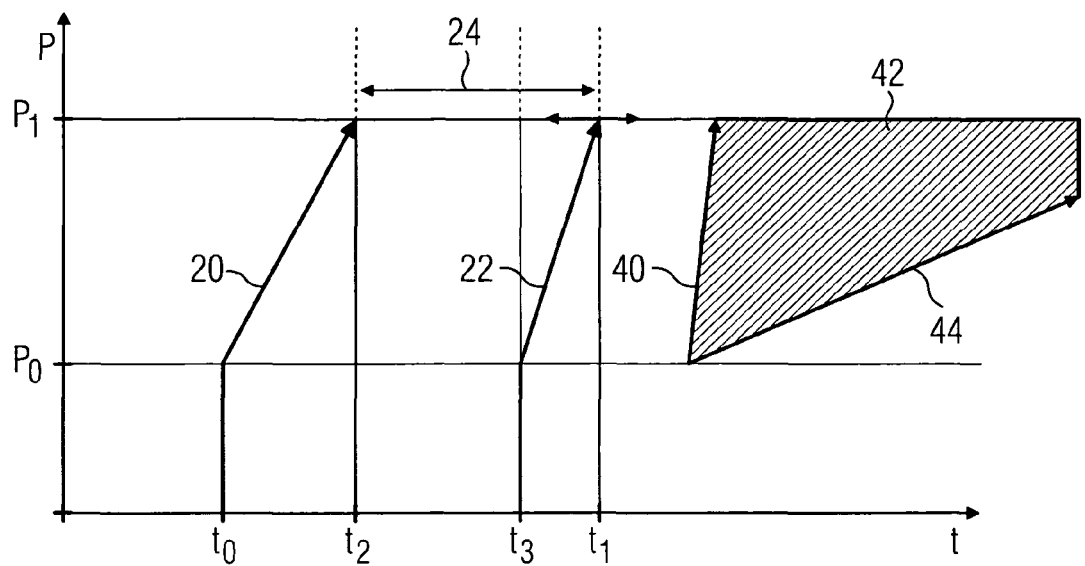
FIG. 1 the description of the method with reference to the power curve.

FIG. 1 shows the curve 20 of the prior art based on that of the turboset 30 comprising a generator and a turbine powered up manually by the operating personnel. The curve is plotted in relation to the time t and the power P. To make the diagram simpler and easier to understand, only linear power curves are shown in FIG. 1. The actual time is labelled $t_0$ in the diagram and the power is labelled $P_0$. At a predetermined target time $t_1$ a power setpoint value $P_1$ is to be provided. The manual power-up of the turboset is identified by the curve 20. This is started so that the power setpoint value $P_1$ is available at the predetermined target time $t_1$. The early powering up of the turboset means however that the power setpoint value $P_1$ is already available at this time $t_2$. Within the period 24, which represents the difference between the point in time $t_2$ and the target time $t_1$, the curve thus moves to an undesired power setpoint value $P_1$, which results in high costs. By contrast the turboset 30 is not started in the invention until a later time, time $t_3$. This avoids an unnecessary period of time 24 at too high a power setpoint value $P_1$. The turboset 30 is started up on the basis of an automatically-computed power curve 22. This power curve 22 is selected such that the turboset 30 does not suffer any damage, meaning that this power curve has the effect of prolonging the life of the unit. For a gas turbine the power curve 22 is selected so that it has a positive effect on the NOx emissions. The power curve 22 is selected such that it lies within the permitted power curve on the basis of which the turboset 30 can be started up or shut down. The permitted area 42 is represented by the maximum power curve 40 and the minimum power curve 44.

Figure 2:
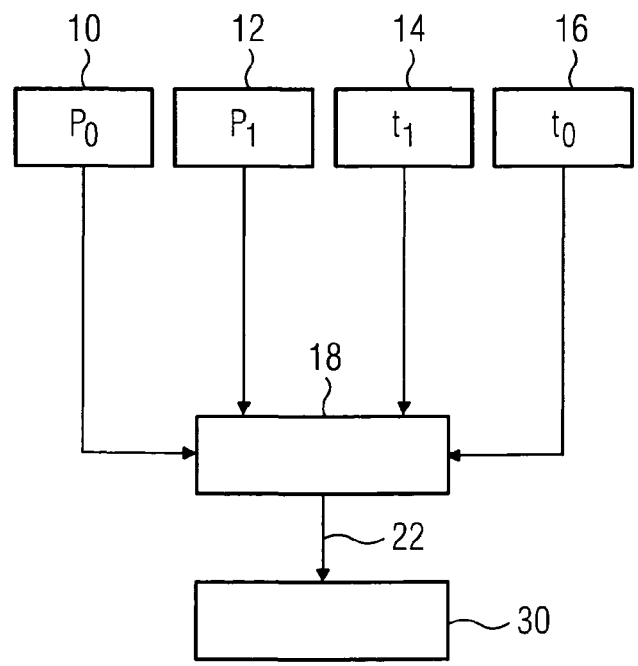
FIG. 2 description of the device.

FIG. 2 is a schematic diagram of a device for increasing the operational flexibility of a current-generating system with turboset, which especially allows the method to be executed. This includes an input unit 12 for the power setpoint value and an input unit 14 for the target time. The device further includes a readout unit for the actual power 10 and a readout unit 16 for the actual time. The reader units 10, 16 as well as the input units 12, 14 are both connected to a computation unit 18 for exchange of data. In the computation unit 18 this data, as well as the operating data, which for example includes the minimum power curve 44 and the maximum power curve 40, is used to automatically compute the power curve 22. The power curve 22 is computed by the computation unit 18 such that this curve does not damage the turboset 30, i.e. adversely affect the service life of the turboset. The power curve 22 thus computed is directed to the turboset for automatic startup or shutdown.

The invention claimed is:

1. A method for increasing the operational flexibility of a current generating system with a turboset having a turbine coupled to an electrical generator, comprising:
   predetermining a power set-point value;
   predetermining a future target time at which the turboset is to exhibit the power set-point value;
   automatically determining a power curve via a computer utilizing the power set-point value and the target time, wherein the power curve prolongs the service life of the generator and the turbine wherein the power curve traverses through an area between a minimum power curve and a maximum power curve characterized by a respective minimum permissible power gradient and a maximum permissible power gradient; and
   executing the power curve on the turboset starting from an actual power at an actual time so that the predetermined power setpoint value is reached at the predetermined target time.

2. The method as claimed in claim 1, wherein the turbine of the turboset is a steam turbine.

3. The method as claimed in claim 1, wherein the turbine of the turboset is a gas turbine.

4. The method as claimed in claim 3, wherein the power curve is selected to minimize the NOx-emissions of the gas turbine.

5. A device for increasing the operational flexibility of a current generating system with turboset having a turbine coupled to an electrical generator, comprising:
   a power set-point value input unit that inputs a power set-point value;
   a target time input unit that inputs a target time value;
   an actual power readout unit that reads out an actual power of the turboset;
   an actual time readout unit that reads out an actual time;
   a computation unit connected to the power set-point value input unit, the target time input unit, the actual power readout unit, and the actual time readout unit, wherein the computation unit automatically computes a power curve by:
      predetermining the power set-point value,
      predetermining a future target time at which the turboset is to exhibit the power set-point value,
      automatically computing the power curve by taking account of operating data,
   wherein the power curve traverses through an area between a minimum power curve and a maximum power curve characterized by a respective minimum permissible power gradient and a maximum permissible power gradient, where the power curve prolongs the service life of the generator and the turbine.

6. The device as claimed in claim 5, wherein the operating data is stored in a characteristics field in the computation unit.

7. The device as claimed in claim 6, wherein the computation unit automatically computes the power curve utilizing the power set-point value and the target time.

8. A turboset having a turbine and an electric generator, comprising:
   a power set-point value input unit that inputs a power set-point value;
   a target time input unit that inputs a target time value;
   an actual power readout unit that reads out an actual power of the turboset;
   an actual time readout unit that reads out an actual time;
   a computation unit connected to the power set-point value input unit, the target time input unit, the actual power readout unit, and the actual time readout unit, wherein the computation unit automatically computes a power curve by:
      predetermining the power set-point value,
      predetermining a future target time at which the turboset is to exhibit the power set-point value,
      automatically computing the power curve by taking account of the operating data, wherein the power curve traverses through an area between a minimum power curve and a maximum power curve characterized by a respective minimum permissible power gradient and a maximum permissible power gradient, where the power curve prolongs the service life of the generator and the turbine.

9. The turboset as claimed in claim 8, wherein the turbine of the turboset is a steam turbine.

10. The turboset as claimed in claim 8, wherein the turbine of the turboset is a gas turbine.

* * * * *